May 9, 1961 H. F. L. JENKINS 2,983,299
PNEUMATIC TYRES
Filed Aug. 25, 1959 2 Sheets-Sheet 1
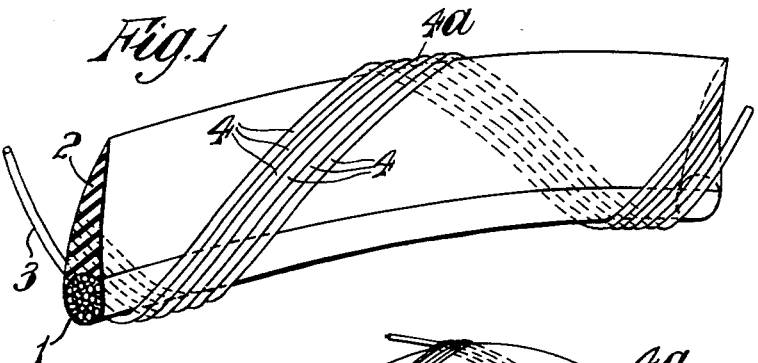
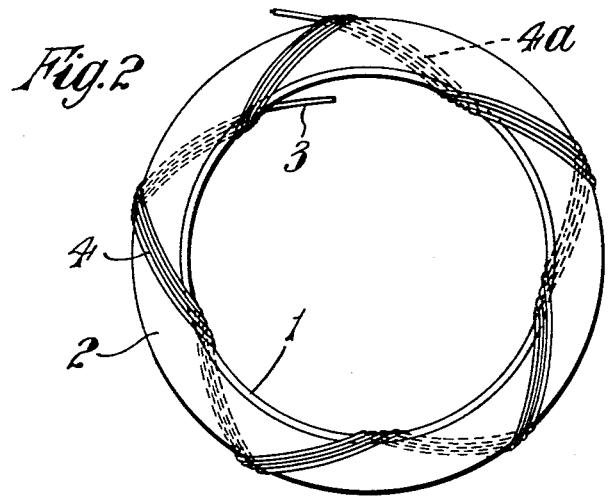
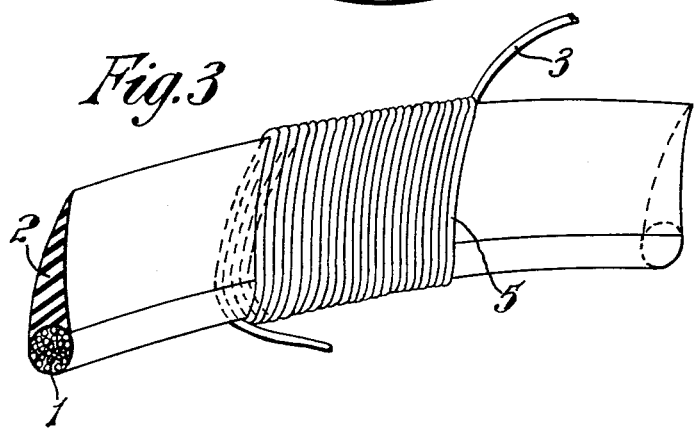
INVENTOR
Herbert Frederick Leonard Jenkins
by Benj. T. Rauber
his attorney May 9, 1961  H. F. L. JENKINS  2,983,299
PNEUMATIC TYRES
Filed Aug. 25, 1959  2 Sheets-Sheet 2
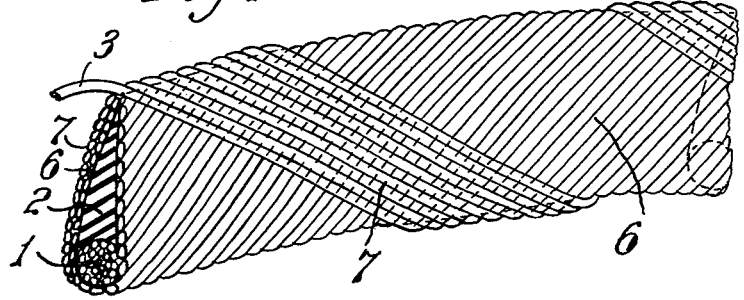
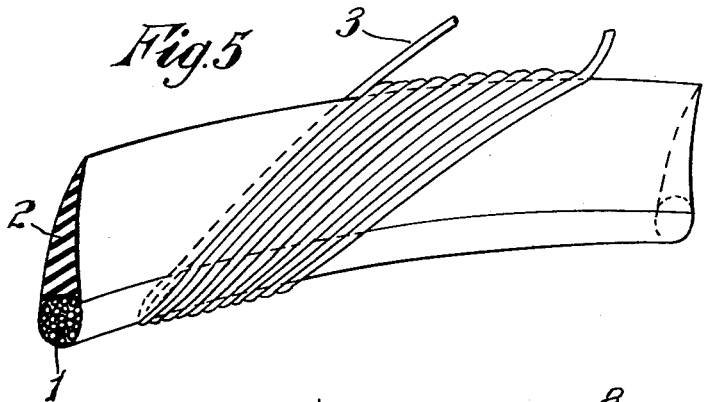
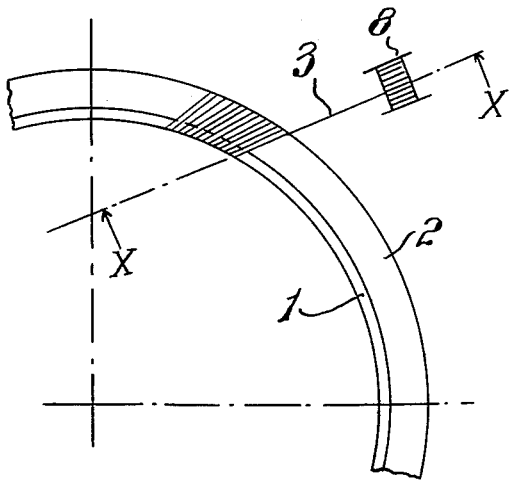

United States Patent Office 2,983,299
Patented May 9, 1961

2,983,299
PNEUMATIC TYRES

Herbert Frederick Leonard Jenkins, Sutton, Coldfield, England, assignor to Dunlop Rubber Company Limited, London, England, a company of Great Britain Filed Aug. 25, 1959, Ser. No. 835,878

Claims priority, application Great Britain Aug. 28, 1958

13 Claims. (Cl. 152—362)

This invention relates to pneumatic tyres and more particularly to wire cord bead filler reinforcements for pneumatic tyres.

In the manufacture of a bead filler containing a wire cord reinforcement the wire cord is applied in the form of a strip of parallel-cord fabric, and this results in a reinforcement containing a large number of cut ends which do not readily adhere to the surrounding rubber and which may become loose during subsequent use of the tyre as a result of the continued flexing of the lower sidewalls.

It is an object of the present invention to provide a wire cord bead filler reinforcement in which the number of cut ends is greatly reduced.

According to the invention, a bead filler reinforcement for a pneumatic tyre comprises a wire cord wound in loops around an annular bead wire and a concentric apex strip projecting beyond the outer periphery of the bead wire, the loops forming a toroidal structure enclosing the bead wire and tapering, in cross-section, radially outwardly beyond the outer periphery of the bead wire.

Preferably, the cord in each loop is disposed at an acute angle to the circumferential direction of the bead wire on the sides of the reinforcement, the cord on one side of the reinforcement lying in an opposed direction to the cord on the other side of the reinforcement.

The apex strip is preferably of natural or synthetic rubber, and the wire cord reinforcement of rubberised steel wire cord, but it is desired to include within the scope of the present invention the use of other materials for these components, such as polyurethane for the apex strip and bare steel wire, to be subsequently bonded to the rubber components of the tyre, for the reinforcement.

Four embodiments of the invention will now be described, by way of examples, with reference to the accompanying drawings, in which:

Figure 1 is a diagrammatic perspective view of part of a bead wire and filler assembly in course of construction;

Figure 2 is a diagrammatic side view of a bead wire and filler assembly in course of construction;

Figure 3 is a diagrammatic perspective view of part of a bead wire and filler assembly in course of construction, showing an alternative filler construction.

Figure 4 is a diagrammatic perspective view of part of a bead wire and filler assembly in course of construction, showing another alternative filler construction.

Figure 5 is a diagrammatic perspective view of part of a bead wire and filler assembly in course of construction;

Figure 6 is a diagrammatic side view of part of a bead wire, showing part of a bobbin mechanism winding a reinforcement as shown in Figure 4.

In the embodiment illustrated in Figures 1 and 2, a bead wire 1 is provided with a rubber apex strip 2. Around the bead wire and apex strip, a rubberised steel wire cord 3 is wound at an acute angle to the circumferential direction of the bead wire.

The cord 3 forms a series of loops 4a, the series of loops forming a convolution 4, i.e. a winding extending around a complete circumference of the bead wire, as shown in Figure 2. In the finished assembly each of the convolutions 4 lies closely adjacent to the next convolution around the whole circumference of the assembly, to form a continuous toroidal structure surrounding the bead wire 1 and apex strip 2. It will be noted that the angle made with the circumferential direction of the bead wire 1 by the portions of the convolutions 4 lying on the side shown in Figures 1 and 2 of the bead wire 1 and apex strip 2 is opposed to the angle made by the portions of said convolutions, shown dotted in Figures 1 and 2, lying on the opposite side of the bead wire 1 and apex strip 2.

The convolutions 4 are produced by mechanical winding apparatus, the cord 3 being carried on a bobbin which travels in a circular path in a plane at right angles to the bead wire and disposed radially thereof, the bead wire 1 being rotated about its axis at a predetermined speed relative to the speed of the bobbin. The relative speeds of rotation of the bobbin and the bead wire are chosen so as to produce a convolution 4 in which the cord 3, after one complete revolution of the bead wire, lies adjacent to the position of the cord 3 at the start of the said revolution. The winding continues until the convolutions 4 completely cover the outer surface of the bead wire 1 and apex strip 2.

In an alternative embodiment the construction of which is shown in Figure 3, the cord 3 is wound around the bead wire 2 in a direction at right angles to the circumferential direction of the bead wire, a single convolution 5 thus forming a continuous toroidal structure.

The embodiment shown in Figure 3 may be produced in a similar manner to that described above, the bead wire being rotated very slowly relative to the speed of the bobbin.

Figure 4 shows a further alternative construction, in which two layers 6 and 7 of the cord 3 are provided. The layer 6 is similar in construction to the winding shown in Figure 1, and the layer 7 is formed on top of the layer 6 by winding the cord 3 in an opposed direction to that used for the layer 6. This is performed by winding the layer 7 with the bead wire 1 rotating in the opposite direction to that used for winding the layer 6.

In Figure 5, the formation of a further alternative construction is shown. In this construction, the cord 3 is wound on the bead wire 1 and apex strip 2 in the same direction on both sides thereof.

The operation of a bobbin 8 to produce a winding of the form shown in Figure 5 is shown in Figure 6. The plane of the path of the bobbin 8, which is at right angles to the plane of the bead wire 1, and indicated by the line X—X, is disposed at an angle to the radial direction at the point of the bead wire where the winding is applied. In this instance, the bead wire 1 will be rotated slowly relative to the rate of rotation of the bobbin 8, the angle of winding and the relative rates of rotation being chosen to produce a closely wound reinforcement by a single revolution of the bead wire.

In the filler reinforcements described above each has only two cord ends for each layer, one at the beginning and one at the end of the winding, and thus the danger of the failure of the adhesion to the surrounding rubber of a large number of cut ends is avoided.

The invention also includes pneumatic tyre covers incorporating a bead filler reinforcement in accordance with the invention. Bead wires provided with a reinforcement as described are applied one to each side of a cylindrical tyre building drum carrying rubberised cord plies. Tread and sidewall rubber is applied to the carcass and the assembled tyre cover removed from the drum and shaped and vulcanised in a conventional manner.

Having now described my invention, what I claim is:

1. A bead filler reinforcement for a pneumatic tyre comprising a wire cord wound in loops around an annular bead wire and a concentric apex strip projecting beyond the outer periphery of the bead wire, the loops forming a toroidal structure enclosing the bead wire and tapering, in cross-section, radially outwardly beyond the outer periphery of the bead wire.

2. A bead filler reinforcement according to claim 1 wherein the cord in each of the loops is disposed at an acute angle to the circumferential direction of the bead wire on each side of the reinforcement, the cord on one side of the reinforcement lying in an opposed direction to the cord on the other side of the reinforcement.

3. A bead filler reinforcement according to claim 2 comprising a plurality of convolutions of cord, each of said convolutions lying in side-by-side relationship to an adjacent convolution.

4. A bead filler reinforcement according to claim 3 wherein said convolutions form a substantially continuous layer surrounding the bead wire.

5. A bead filler reinforcement according to claim 4 wherein a plurality of layers are provided, the cords in each layer crossing the cords of an adjacent layer.

6. A bead filler reinforcement according to claim 1 wherein the loops lie in side-by-side relationship and wherein the cord in each loop follows a path which is substantially at right angles to the circumferential direction of the bead wire along the whole length of each of the loops.

7. A bead filler reinforcement according to claim 1 wherein the cord in each of the loops is disposed at an acute angle to the circumferential direction of the bead wire along the whole length of each of the loops, the length of cord on one side of the reinforcement in each loop lying, in side view, parallel to the length of cord on the other side of the reinforcement.

8. A bead filler reinforcement according to claim 1 wherein the cords are of steel wire.

9. A bead filler reinforcement according to claim 1 wherein the apex strip is of rubber.

10. A pneumatic tyre comprising a bead filler reinforcement according to claim 1.

11. A bead and filler assembly which comprises a bead wire, a filler of elastomeric material encircling said bead wire with its inner periphery contacting the outer perimeter of said bead wire and tapering radially outwardly therefrom and a reinforcing cord wound about said assembled bead wire and filler assembly in successive loops to enclose and cover said assembled bead wire and filler.

12. The bead and filler assembly of claim 11 in which said cord is inclined at an angle to the circumference of said assembly.

13. The bead and filler assembly of claim 11 having two layers of cord, the cords of one layer being transverse to those of the other layer.

References Cited in the file of this patent

UNITED STATES PATENTS

| | | |
|---|---|---|
| 1,670,044 | Pierce | May 15, 1928 |
| 1,763,179 | Pierce | June 10, 1930 |
| 2,181,475 | Bourdon | Nov. 28, 1939 |